3,396,105
DRILLING FLUID TREATMENT
Ralph F. Burdyn and Ludwig D. Wiener, Dallas, Tex., assignors to Mobil Oil Corporation, a corporation of New York
No Drawing. Continuation-in-part of application Ser. No. 608,672, Sept. 10, 1956. This application Aug. 19, 1963, Ser. No. 303,145
2 Claims. (Cl. 252—8.5)

This application is a continuation-in-part of our copending application Ser. No. 608,672, filed Sept. 10, 1956, now Patent No. 3,236,769. This latter application is a continuation-in-part of applications Ser. No. 327,793, filed Dec. 18, 1952, now abandoned; Ser. No. 429,364 filed May 12, 1954, now abandoned; and Ser. No. 507,728, filed May 11, 1955, now abandoned, which applications were copending with said latter application.

This invention relates to drilling fluids and relates more particularly to improvements in the rheological properties of drilling fluids.

In the drilling of wells, such as oil or gas wells, by the rotary method, a drilling fluid is circulated from the surface of the earth to the drill bit and back to the surface again for the purposes of cooling the drill bit, removing earth cuttings from the bore hole, and imposing a hydrostatic pressure on the drilled earth formations to prevent flow of fluid therefrom into the well bore hole. In a drilling fluid containing water and clay, the rheological properties of plastic viscosity, gel strength, and yield point, which must be maintained within limits in order that the drilling fluid remain pumpable and perform its desired functions, depend largely upon the concentration of clay solids and the extent to which the clay solids are hydrated by and dispersed within the water contained in the fluid. Where the well bore hole passes through formations containing clay, the clay admixes with the drilling fluid and this clay is hydrated by and dispersed by the water in the drilling fluid, thereby increasing the concentration of dispersed clay solids. The increase in the concentration of dispersed clay solids deleteriously affects the rheological properties of the drilling fluid. Accordingly, where control of rheological properties is important, the drilling fluid should have a minimum change in such properties with increasing concentrations of clay solids.

Customarily, during the drilling of a well, a log of the well is made. The log is made by passing a logging tool through the well and measuring the properties of the formations penetrated by the well. Various of these measurements are made electrically and in order that they may be made with accuracy, interference from the electrical properties of the drilling fluid should be at a minimum. Minimum interference occurs where the electrical resistivity of the drilling fluid is relatively high.

Another property desired in a drilling fluid is that of resisting solidification at high temperature. With increasing depth of the well, the bottom hole temperature increases. In many wells, these temperatures exceed 300° F. With aqueous drilling fluids, high temperatures induce cementation reactions between clay minerals and various drilling fluid additives. As a result, the drilling fluid tends to attain excessively high gel strengths and to solidify. With solidification, excessively high pump pressures are required to break circulation with the result that often loss of the drilling fluid occurs by being forced into permeable formations. Additionally, solidification of the drilling fluid can prevent logging tools from reaching the bottom of the well.

Frequently, during the drilling of a well, drilling conditions change. Changes in temperature occur. The character of the formations being drilled may change, as, for example, salt may be encountered. Each change in drilling conditions can affect the properties of the drilling fluid. Frequently, to counteract the effect of the changed drilling conditions on the properties of the drilling fluid a change in the composition or character of the drilling fluid is required.

It is an object of this invention to provide a drilling fluid which has a minimum change in rheological properties with change in concentration of clay solids. It is a more particular object of this invention to provide a drilling fluid which has a minimum increase in yield point with increasing concentration of clay solid. It is another object of this invention to provide a drilling fluid having a high electrical resistivity. It is another object of this invention to provide a drilling fluid which is resistant to high temperature solidification. It is another object of this invention to provide a drilling fluid which can be changed in composition or character to meet changes in drilling conditions. These and other objects of the invention will become apparent from the following detailed description.

The several objects and advantages in a drilling fluid are effected according to the present invention by adding a water soluble, non-ionic compound having surface active properties and characterized by the formula $$R\!-\!(X\!-\![(CH_2\!-\!CH_2\!-\!O)_n\!-\!H]_m)_y$$

wherein R is a hydrophobic group containing at least four carbon atoms, X is a structural element selected from the group consisting of —O—, —S—,

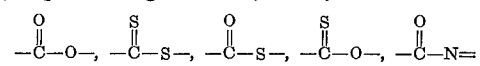

and

($CH_2$—$CH_2$—O) is ethylene oxide, $n$ is a whole number, His hydrogen, $m$ is a whole number one less than the valence of the structural element X, $y$ is a whole number, and the product of $n$, $m$, and $y$ is at least as great as ten. Where $m$ is two, $n$ may be equal or unequal for each of the ($CH_2$—$CH_2$—O)$_n$—H groups. It is preferred to employ a water soluble, non-ionic compound wherein $y$ has a value of one. The latter compounds may be represented by the formula $$[R\!-\!X][(CH_2\!-\!CH_2\!-\!O)_n\!-\!H]_m$$

We have found that the water soluble, non-ionic compound having surface active properties and characterized by the formula R—(X—[($CH_2$—$CH_2$—O)$_n$—H]$_m$)$_y$, hereinafter termed the "non-ionic compound," imparts unique properties to the drilling fluid. For example, we have found that the addition of the non-ionic compound in increasing quantities to a mixture of bentonite and water sometimes results at first in an increase in the yield point of the mixture to a maximum but thereafter always results in a decrease in the yield point of the mixture to a point below the original yield point. Thus, the addition of the non-ionic compound in sufficient quantities to a drilling fluid containing water and clay markedly decreases the yield point of the fluid. Further, the gel strength of the fluid is decreased. We have also found that where a drilling fluid containing water and clay is prepared by admixing the non-ionic compound with the water prior to admixing the water with the clay, the yield point, plastic viscosity, and gel strengths will be lower than where the non-ionic compound is added to a mixture of clay and water. Accordingly, by the invention, a drilling fluid containing water and clay may be made up having a high concentration of clay solids but the yield point and gel strength will be lower than would ordinarily be encountered with such concentrations of clay solids. Furthermore, where the concentration of clay solids in the drilling fluid is increased thereafter, as by picking up clay from the formations being drilled, the increase in yield point is minimized. Since the non-ionic compound does not alter the conductivity of the drilling fluid, electrical logging of the well during drilling can be carried out. Additionally, the drilling fluid has no tendency toward solidification at high well temperatures. Also, the drilling fluid lends itself to changes in composition or character where such changes are desired to meet changed drilling conditions.

The non-ionic compound may be described as a non-ionic flocculating or agglomerating agent for clay. While we do not wish our invention to be limited to the consequences of any theory, it is believed that the reduction in yield point of the drilling fluid is due to the effect of the non-ionic compound in preventing or minimizing dispersion of the clay solids. Upon admixture of clay solids with water, the clay solids hydrate and, with bentonites such as sodium bentonite, the clay particles become negatively charged and surrounded by what may be termed an atmosphere of positively charged monovalent ions. Because of the atmosphere of positively charged monovalent ions, the clay particles, in the form of platelets, are repulsed from each other and are thus maintained in a state of dispersion in the water. Where the non-ionic compound is present in the mixture of clay and water, the $(CH_2-CH_2-O)_n-H$ portion of the molecule apparently attaches, as a result of surface adsorption phenomena influenced by the hydrophobic portion of the molecule, to the platelets of clay and, for reasons that are not clearly understood, the effect of the atmosphere of positively charged monovalent ions in maintaining the platelets of clay repulsed from each other and thus dispersed is lessened, with the result that the platelets of clay no longer remain dispersed but, rather, tend to agglomerate as micelles. Normally, as when agglomeration is brought about by electrolyte contamination, strong edge to edge and edge to plate forces exist, resulting in a high yield point and gel strength. Upon adsorption of the non-ionic compound, however, plate to plate agglomeration predominates, and the presence of the relatively thick hydrated layer of adsorbed non-ionic compound on the micelle effectively reduces the intermicellar attractive forces. As a result, the yield point and gel strength of the mixture of clay and water are decreased. Where the mixture of clay and water contains more than sufficient non-ionic compound to minimize dispersion of the clay solids already contained therein, any additional clay solids added to the mixture will similarly not disperse but will enter into the state of incomplete agglomeration.

Since it is believed that the reduction in yield point of the drilling fluid is due to the effect of the non-ionic compound in preventing or minimizing dispersion of the clay solids in the aqueous phase of the drilling fluids, it is essential that the non-ionic compound be water soluble in order that it will be present in the aqueous phase of the drilling fluid. The oxyethylene portion, namely, the $(CH_2-CH_2-O)_n-H$ portion of the molecule imparts water solubility to the non-ionic compound. Where the product of $n$, $m$, and $y$ has a value of at least 10, the non-ionic compound has sufficient water solubility to perform the desired functions in the drilling fluid. The value of the product of $n$, $m$, and $y$ may be between 10 and 300 and may be even higher. Preferably the value of the product of $n$, $m$, and $y$ is about 30.

The hydrophobic group, R, of the non-ionic compound may be an aliphatic group or an aromatic group. Suitable hydrophobic groups are, for example, alkyl, aryl, alkaryl, and aralkyl groups. The hydrophobic group need not be a hydrocarbon group. The hydrophobic group may, for example, contain oxygen so long as it also contains at least four carbon atoms. Groups such as polyoxypropylene are satisfactory. Preferably, the hydrophobic group contains six to ten carbon atoms. Two or more non-ionic compounds may be employed, if desired. Where the drilling fluid contains two or more non-ionic compounds, the hydrophobic group, R, of one of these may contain twelve or more carbon atoms. Further, the drilling fluid may contain oil, as more fully described hereinafter. In this case, also, the hydrophobic group, R, of the non-ionic compound may contain twelve or more carbon atoms. Otherwise, however, the hydrophobic group, R, of the non-ionic compound should contain less than twelve carbon atoms.

Representative non-ionic compounds which may be employed in the practice of the invention include:

Polyoxyethylene ether of butyl alcohol—

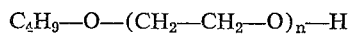
$$C_4H_9-O-(CH_2-CH_2-O)_n-H$$

Polyoxyethylene ether of amyl alcohol—

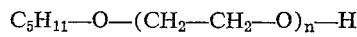
$$C_5H_{11}-O-(CH_2-CH_2-O)_n-H$$

Polyoxyethylene ether of hexyl alcohol—

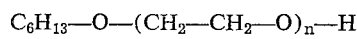
$$C_6H_{13}-O-(CH_2-CH_2-O)_n-H$$

Polyoxyethylene ether of hexane diol—

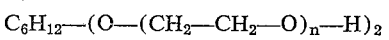
$$C_6H_{12}-(O-(CH_2-CH_2-O)_n-H)_2$$

Polyoxyethylene ether of heptyl alcohol—

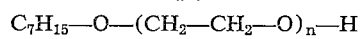
$$C_7H_{15}-O-(CH_2-CH_2-O)_n-H$$

Polyoxyethylene ether of octyl alcohol—

$$C_8H_{17}-O-(CH_2-CH_2O)_n-H$$

Polyoxyethylene ether of nonyl alcohol—

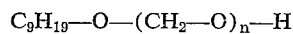
$$C_9H_{19}-O-(CH_2-O)_n-H$$

Polyoxyethylene ether of decyl alcohol—

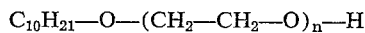
$$C_{10}H_{21}-O-(CH_2-CH_2-O)_n-H$$

Polyoxyethylene ether of undecyl alcohol—

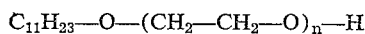
$$C_{11}H_{23}-O-(CH_2-CH_2-O)_n-H$$

Polyoxyethylene ether of dodecyl alcohol—

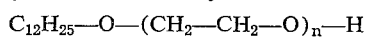
$$C_{12}H_{25}-O-(CH_2-CH_2-O)_n-H$$

Polyoxyethylene ether of phenol—

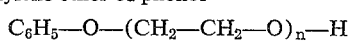
$$C_6H_5-O-(CH_2-CH_2-O)_n-H$$

Polyoxyethylene ether of di-octyl phenol—

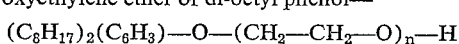
$$(C_8H_{17})_2(C_6H_3)-O-(CH_2-CH_2-O)_n-H$$

Polyoxyethylene ether of di-nonyl phenol—

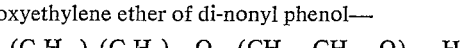
$$(C_9H_{19})_2(C_6H_3)-O-(CH_2-CH_2-O)_n-H$$

Polyoxyethylene thiolstearate—

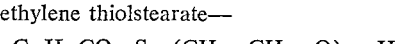
$$C_{17}H_{35}CO-S-(CH_2-CH_2-O)_n-H$$

Polyoxyethylene thionpalmitate—

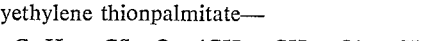
$$C_{15}H_{31}-CS-O-(CH_2-CH_2-O)_n-H$$

Monopolyoxyethylene myristamide—

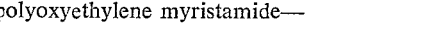
$$C_{13}H_{27}-CO-NH-(CH_2-CH_2-O)_n-H$$

Polyoxyethylene ether of nonyl phenol—

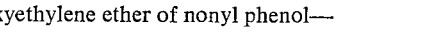
$$C_9H_{19}(C_6H_4)-O-(CH_2-CH_2-O)_n-H$$

Polyoxyethylene ether of oleyl alcohol—

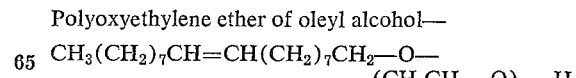
$$CH_3(CH_2)_7CH=CH(CH_2)_7CH_2-O-(CH_2CH_2-O)_n-H$$

Polyoxyethylene ether of stearyl alcohol—

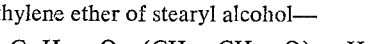
$$C_{18}H_{37}-O-(CH_2-CH_2-O)_n-H$$

Polyoxyethylene ether of palmityl alcohol—

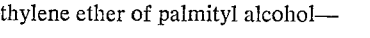
$$C_{16}H_{33}-O-(CH_2-CH_2-O)_n-H$$

Polyoxyethylene thioether of nonyl phenol—

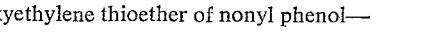
$$C_9H_{19}(C_6H_5)-S-(CH_2-CH_2-O)_n-H$$

Polyoxyethylene thioether of oleyl alcohol—

$$CH_3(CH_2)_7CH=CH(CH_2)_7CH_2-S-(CH_2-CH_2-O)_n-H$$

Polyoxyethylene thioether of stearyl alcohol—

$$C_{18}H_{37}-S-(CH_2-CH_2-O)_n-H$$

Polyoxyethylene thioether of palmityl alcohol—

$$C_{16}H_{33}-S-(CH_2-CH_2-O)_n-H$$

Dipolyoxyethylene stearamide—

$$C_{17}H_{35}-CO-N\begin{array}{c}(CH_2-CH_2-O)_n-H\\(CH_2-CH_2-O)_n-H\end{array}$$

Dipolyoxyethylene palmitamide—

$$C_{15}H_{31}-CO-N\begin{array}{c}(CH_2-CH_2-O)_n-H\\(CH_2-CH_2-O)_n-H\end{array}$$

Dipolyoxyethylene myristamide—

$$C_{13}H_{27}-CO-N\begin{array}{c}(CH_2-CH_2-O)_n-H\\(CH_2-CH_2-O)_n-H\end{array}$$

Dipolyoxyethylene oleamide—

$$CH_3(CH_2)_7CH=CH(CH_2)_7-CO-N\begin{array}{c}(CH_2-CH_2-O)_n-H\\(CH_2-CH_2-O)_n-H\end{array}$$

Polyoxyethylene stearate—

$$C_{17}H_{35}-CO-O-(CH_2-CH_2-O)_n-H$$

Polyoxyethylene palmitate—

$$C_{15}H_{31}-CO-O-(CH_2-CH_2O)_n-H$$

Polyoxyethylene Myristate—

$$C_{13}H_{27}-CO-O-(CH_2-CH_2)_n-H$$

Polyoxyethylene oleate—

$$CH_3(CH_2)_7CH=CH(CH_2)_7-CO-O-(CH_2-CH_2-O)_n-H$$

Polyoxyethylene dithionstearate—

$$C_{17}H_{35}-CS-S-(CH_2-CH_2-O)_n-H$$

Polyoxyethylene abietate—

$$C_{19}H_{29}-CO-O-(CH_2-CH_2-O)_n-H$$

Polyoxyethylene dithionpalmitate—

$$C_{15}H_{31}-CS-S-(CH_2-CH_2-O)_n-H$$

Polyoxyethylene dithionmyristate—

$$C_{13}H_{27}-CS-S-(CH_2-CH_2-O)_n-H$$

Polyoxyethylene dithionoleate—

$$CH_3(CH_2)_7CH=CH(CH_2)_7-CS-S-(CH_2-CH_2-O)_n-H$$

Polyoxyethylene ether of octyl phenol—

$$C_8H_{17}(C_6H_4)-O-(CH_2CH_2-O)_n-H$$

Polyoxyethylene ether of octyl naphthol—

$$C_8H_{17}(C_{10}H_6)-O-(CH_2-CH_2-O)_n-H$$

Polyoxyethylene ether of nonyl naphthol—

$$C_9H_{19}(C_{10}H_6)-O-(CH_2-CH_2-O)_n-H$$

Polyoxyethylene ether of resorcinol—

$$C_6H_4\begin{array}{c}O-(CH_2-CH_2-O)_n-H\\O-(CH_2-CH_2-O)_n-H\end{array}$$

Polyoxyethylene ether of polyoxypropylene—

$$HO(CH_2-CH_2-O)_n-(CH_2-CH_2-CH_2-O)_x-(CH_2-CH_2-O)_n-H$$

In each of the above mentioned compounds, the product of $n$, $m$, and $y$ is at least ten. In computing this product, where $n$ appears more than once, the summation is employed. Further, where $n$ appears more than once, the $n$'s may or may not be equal to each other. In connection with polyoxyethylene ether or polyoxypropylene, $x$ may be any whole number at least as great as two.

Preferred non-ionic compounds are polyoxyethylene ether of phenol, polyoxyethylene ether of hexyl alcohol, polyoxyethylene ether of heptyl alcohol, polyoxyethylene ether of octyl alcohol, polyoxyethylene ether of nonyl alcohol, and polyoxyethylene ether of decyl alcohol.

Since the non-ionic compound acts, apparently, by adsorption on the surface of the clay solids, a given amount of non-ionic compound will be more effective where the clay solids have a smaller surface area per unit weight than where the clay solids have a greater surface area per unit weight. Accordingly, the amount of non-ionic compound to be employed to obtain a desired yield point in any particular case will depend upon the type and particle size of the clay solids and upon the type of non-ionic compound selected. Further, as has been stated, it has been found that the yield point, as well as the plastic viscosity and gel strength of the drilling fluid containing the non-ionic compound is lower where the clay is added to water containing the non-ionic material than where the non-ionic material is added to a mixture of water and clay. Accordingly, the amount of non-ionic compound to be employed to obtain a desired yield point in any particular case will also depend upon whether the non-ionic compound is added to a mixture of clay and water or the clay is added to water containing the non-ionic compound. The amount of non-ionic compound may be greater than about two pounds per barrel of drilling fluid. Desirably, however, the non-ionic compound is employed in an amount such that the concentration of the free compound in the aqueous phase of the drilling fluid is at least 0.5 pound per barrel of the drilling fluid. By "concentration of the free compound" is meant the concentration of compound dissolved in the aqueous phase of the drilling fluid and not reacted with clay solids. Preferably, the non-ionic compound is employed in an amount such that the concentration of the free compound in the aqueous phase of the drilling fluid is at least 1.5 pounds per barrel of drilling fluid. Satisfactory results have been obtained where the amount was such that the concentration of the free compound in the aqueous phase of the drilling fluid was as high as 10 pounds per barrel of drilling fluid. A combination of various non-ionic compounds may be employed, if desired.

In the practice of the invention, the non-ionic compound may be added to the drilling fluid upon preparation thereof, or after preparation thereof as during drilling. The non-ionic compound may be added to the drilling fluid during drilling at the mud pit, at the entrance to the mud pumps, or at any other desired location. Since the effect of the non-ionic compound is greater where the clay is added to water containing the non-ionic compound, it is preferred to make up the drilling fluid by adding the clay to water containing the non-ionic compound. Similarly, during drilling, it is preferred, when the drilling fluid is picking up, or is expected to pick up, clay from the drilled formations to add the non-ionic compound to the drilling fluid before the drilling fluid has picked up sufficient clay to raise the yield point to an undesired extent, since the effect of the non-ionic compound by this procedure will be greater per unit amount employed than where the compound is added to the fluid after the clay has been picked up and dispersed therein.

An important property of a successful drilling fluid is to resist foaming. Indeed, the very use of a drilling fluid where gas formation may and usually is encountered in the successful discovery of oil or gas or both dictates as an essential property a resistance of the fluid to formation of foams, i.e., gas cutting reduces the specific gravity of the fluid when gas is encountered, offsetting the heavy hydrostatic sealing effect of the fluid in the well. The surface active effect, however, of the non-ionic compounds described above, tends to facilitate if not induce foaming, and particularly indicates the use of a deforming substance in combination therewith.

As an important aspect of this invention, the non-ionic surfactant compounds described above are not only used with a defoamant, but with particular defoamers which improve the drilling fluid in other, secondary aspects. Particularly our defoamant, itself a surface active compound, is predominantly hydrophobic, and is non-ionic similar to the type of compound described above. Consequently, but to a lesser degree, it favorably affects the yield point and gelating properties of the fluid containing clay suspended therein. Surprisingly, it is outstanding in its foam inhibiting effect in contrast to the above non-ionic compounds. Our preferred defoamer is a predominantly hydrophobic, non-ionic compound having surface active properties and characterized by the formula $$R'—(X—[(CH_2—CH_2—O)_k—H]_m)_y$$

wherein $R'$ is a hydrophobic group containing at least twelve carbon atoms, X is a structural element selected from the group consisting of —O—, —S—, $$-\overset{O}{\underset{\|}{C}}-O-, \quad -\overset{S}{\underset{\|}{C}}-S-, \quad -\overset{O}{\underset{\|}{C}}-S-, \quad -\overset{S}{\underset{\|}{C}}-O-, \quad -\overset{O}{\underset{\|}{C}}-N=$$

and $$-\overset{O}{\underset{\|}{C}}-NH-$$

($CH_2—CH_2—O$) is ethylene oxide, $k$ is a whole number, H is hydrogen, $m$ is a whole number one less than the valence of the structural element X, $y$ is a whole number, and the product of $k$, $m$, and $y$ is not greater than three. This compound is termed hereinafter the "predominantly hydrophobic compound." It is preferred to employ a predominantly hydrophobic compound wherein $y$ has a value of one. The latter compounds may be represented by the formula:

$$[R'—X][(CH_2—CH_2—O)_k—H]_m$$

The hydrophobic group, $R'$, of the predominantly hydrophobic compound may be an aliphatic group or an aromatic group. Suitable hydrophobic groups are, for example, alkyl, aryl, alkaryl, and aralkyl groups. The hydrophobic group need not be a hydrocarbon group. The hydrophobic group may, for example, contain oxygen so long as it also contains at least twelve carbon atoms. Groups such as polyoxypropylene are satisfactory. Representative compounds which may be employed in the practice of the invention include:

oxyethylene ether of dodecyl alcohol—

$$C_{12}H_{25}—O—(CH_2—CH_2—O)_k—H$$

oxyethylene ether of tetradecyl alcohol—

$$C_{14}H_{29}—O—(_2—CH_2—O)_k—H$$

oxyethylene ether of hexyl phenol—

$$C_6H_{13}—(C_6H_4)—O—(CH_2—CH_2—O)_k—H$$

oxyethylene ether of heptyl phenol—

$$C_7H_{15}—(C_6H_4)—O—(CH_2—CH_2—O)_k—H$$

oxyethylene ether of nonyl phenol—

$$C_9H_{19}—(C_6H_4)—O—(CH_2—CH_2—O)_k—H$$

oxyethylene ether of octyl phenol—

$$C_8H_{17}(C_6R_4)—O—(CH_2—CH_2—O)_k—H$$

oxyethylene ether of oleyl alcohol—

$$CH_3(CH_2)_7CH=CH(CH_2)_7CH_2$$
$$—O—(CH_2—CH_2—O)_k—H$$

oxyethylene ether of stearyl alcohol—

$$C_{18}H_{37}—O—(CH_2—CH_2—O)_k—H$$

oxyethylene ether of palmityl alcohol—

$$C_{16}H_{33}—O—(CH_2—CH_2—O)_k—H$$

oxyethylene thioether of nonyl phenol—

$$C_9H_{19}(C_6H_4)—S—(CH_2—CH_2—O)_k—H$$

oxyethylene thioether of oleyl alcohol—

$$CH_3(CH_2)_7—CH=CH(CH_2)_7CH_2$$
$$—S—(CH_2—CH_2—O)_k—H$$

oxyethylene thioether of stearyl alcohol—

$$C_{18}H_{37}—S—(CH_2—CH_2—O)_k—H$$

oxyethylene thioether of palmityl alcohol—

$$C_{16}H_{33}—S—(CH_2—CH_2—O)_k—H$$

Oxyethylene stearamide—

$$C_{17}H_{35}—CO—N \begin{cases} (CH_2—CH_2—O)_k—H \\ (CH_2—CH_2—O)_k—H \end{cases}$$

Oxyethylene palmitamide—

$$C_{15}H_{31}—CO—N \begin{cases} (CH_2—CH_2—O)_k—H \\ (CH_2—CH_2—O)_k—H \end{cases}$$

Oxyethylene myristamide—

$$C_{13}H_{13}—CO—N \begin{cases} (CH_2—CH_2—O)_k—H \\ (CH_2—CH_2—O)_k—H \end{cases}$$

Oxyethylene oleamide—

$$CH_3(CH_2)_7CH=CH(CH_2)_7—CO—N \begin{cases} (CH_2—CH_2—O)_k—H \\ (CH_2—CH_2—O)_k—H \end{cases}$$

Oxyethylene stearate—

$$C_{17}H_{35}—CO—O—(CH_2—CH_2—O)_k—H$$

oxyethylene palmitate—

$$C_{15}H_{31}—CO—O—(CH_2—CH_2—O)_k—H$$

oxyethylene myristate—

$$C_{13}H_{27}—CO—O—(CH_2—CH_2—O)_k—H$$

oxyethylene oleate—

$$CH_3(CH_2)_7CH=CH(CH_2)_7—CO$$
$$—O—(CH_2—CH_2—O)_k—H$$

oxyethylene dithionstearate—

$$C_{17}H_{35}—CS—S—(CH_2—CH_2—O)_k—H$$

oxyethylene dithionpalmitate—

$$C_{15}H_{31}—CS—S—(CH_2—CH_2—O)_k—H$$

oxyethylene dithionmyristate—

$$C_{13}H_{27}—CS—S—(CH_2—CH_2—O)_k—H$$

oxyethylene dithionoleate—

$$CH_3(CH_2)_7CH=CH(CH_2)_7—CS$$
$$—S—((CH_2—CH_2—O)_k—H$$

oxyethylene ether of nonyl naphthol—

$$C_9H_{19}(C_{10}H_6)—O—(CH_2—CH_2—O)_k—H$$

oxyethylene ether of octyl naphthol—

$$C_8H_{17}(C_{10}H_6)—O—(CH_2—CH_2—O)_k—H$$

oxyethylene ether of di-octyl phenol—

$$(C_8H_{17})_2(C_6H_3)—O—(CH_2—CH_2—O)_k—H$$

oxyethylene ether of di-nonyl phenol—

$$(C_9H_{19})_2(C_6H_3)—O—(CH_2—CH_2—O)_k—H$$

oxyethylene ether of nonyl resorcinol—

$$C_9H_{19}—C_6H_3—(O—(CH_2—CH_2O—)_k)_2$$

oxyethylene abietate—

$$C_{19}H_{29}—CO—O—(CH_2—CH_2—O)_k—H$$

oxyethylene ether of polyoxypropylene—

$$HO—(CH_2—CH_2—O)_k—(CH_2—CH_2—CH_2—O)_x$$
$$—(CH_2—CH_2—O)_k—H$$

where $x$ has a value of at least 4.

The prefix "poly" is not included in the names of the above compounds. This is so since the product of $k$, $m$, and $y$ may be one. However, the product of $k$, $m$, and $y$ may also be two or three. In computing this product, where $k$ appears more than once, the summation is employed. Further, where $k$ appears more than once, the $k$ may or may not be equal to each other. In connection with oxyethylene ether of polyoxypropylene, $x$ may be any whole number at least as great as four.

Preferred predominantly hydrophobic compounds are oxyethylene ether of nonyl phenol, oxyethylene ether of di-nonyl phenol, oxyethylene ether of octyl phenol, oxyethylene ether of di-octyl phenol, and oxyethylene abietate.

Where a predominant hydrophobic compound having the formula $R—(X—[(CH_2—CH_2—O)_k—H]_m)_y$ is employed as a defoamant, the amount thereof should be less than the amount of the non-ionic compound in order to obtain satisfactory results. Preferably, the amount of predominantly hydrophobic compound should be not more than one-fifth the amount of the non-ionic compound. On the other hand, the amount of the predominantly hydrophobic compound is preferably not less than one-thirtieth the amount of the non-ionic compound.

Various oils commonly added to form the emulsion type drilling fluids tend to bind surface active compounds at the interface of the emulsion and, to the extent that the surface active compounds tend to promote foaming, the oil will inhibit and reduce such foaming tendency. Typical oils for addition to drilling fluids include vegetable oils such as castor oil, cottonseed oil, linseed oil, rapeseed oil, olive oil, peanut oil, palm oil, coconut oil, tung oil, and corn oil. Other oils which may be employed include animal oils such as neat's foot oil and fish oil such as whale oil. It is preferred, however, to employ, as the oil, a mineral oil. Suitable mineral oils include petroleum crude oil, Diesel oil, fuel oil, gas oil, and the like.

Other oily substances which function similarly may be employed, including the various ethyl, propyl, butyl, amyl, glycerol, diglycerol, triglycerol, glycol, diglycol, and sorbitan laurates, myristates, palmitates, oleates, stearates, ricinoleates, and linoleates. Included among these compounds are the propyl, isopropyl, butyl, 2-methyl propyl, isobutyl, amyl, 2-methyl butyl, and methly butyl laurates, myristates, palmitates, oleates, stearates, ricinoleates, and linoleates. Monoalcohols containing at least 6 carbon atoms may be used. Among these alcohols is capryl alcohol. The heavy metal and the alkaline earth salts of fatty acids, the fatty acids containing at least 8 carbon atoms, may also be employed. Included among these compounds are the aluminum, calcium, barium, and zinc oleates and stearates. Amides of fatty acids, the acids containing at least 8 carbon atoms, are included among the defoamants. A satisfactory amide of a fatty acid is stearamide. Silicones may also be employed. A satisfactory silicone is the one sold by Dow Corning Corporation under the trade name "Antifoam A." Preferred among these defoamants are diglycol laurate, sorbitan trioleate, capryl alcohol, and calcium stearate.

This type of defoamer is not only itself effective for functioning as a defoamer but carries with it both the inherent further advantages of using enough oil to form a substantial oil-in-water emulsion with the known advantages of using an oil-in-water emulsion as a drilling fluid, and the further advantage that the non-ionic yield point reducing component acts further to stabilize such emulsion.

The amount of oil type of defoamant may be as desired depending somewhat upon its purpose. Where the oil is used solely to assert some substantial defoamant effect, it should exceed about 0.1 pound per barrel and will usually be less than about 10 pounds per barrel. For the same purpose where the defoamant is a cheap, commercially available natural oil, it may be present in quantity of about 1 to 5 percent by volume of the drilling fluid, which is adequate to affect the foaming tendency. However, where as preferred, a mineral oil defoamant is used and sufficient oil is desirably present to form a typical oil-in-water drilling fluid emulsion, the quantity of oil is at least 5 percent and is increased up to about 15 percent by volume based on the drilling fluid and preferably would be in the range of 8 to 15 percent.

As pointed out, the non-ionic compound in the aqueous phase of the drilling fluid acts to emulsify any oil admixed with the fluid. Accordingly, any oil admixed with the drilling fluid will be dispersed in the aqueous phase of the fluid. As is known, emulsion drilling fluids have advantages over drilling fluids having a liquid phase consisting entirely of water. Among these advantages are reduced specific gravity, reduced filter loss, and improved lubricating properties. In accordance with a feature of this invention, the drilling fluid containing water, clay and the non-ionic compound may have admixed therewith oil in sufficient quantity to provide the additional advantages of an emulsion drilling fluid.

The preferred non-ionic defoaming agent is far more effective than the oil type of defoamer. It also tends, as the surfactant, to further stabilize the oil-in-water emulsion. Consequently when oil is used, the non-ionic defoamer may also be present for increased stability, and the defoaming effect results in part from both types of defoaming agent in the combination.

The effect of the non-ionic compounds in the aqueous phase of the drilling fluid to emulsify oil admixed with the fluid decreases with the number of carbon atoms in the hydrophobic group, R. Where oil is contained in the drilling fluid and the non-ionic compound employed has a hydrophobic group, R, containing not more than twelve carbon atoms, it is preferred to admix with the drilling fluid a non-ionic compound having a hydrophobic group containing more than twelve carbon atoms. The amount of this non-ionic compound may be as desired to effect emulsification of the oil. Generally, satisfactory results are obtained with amounts of this non-ionic compound between about one-half and one and one-half pounds per barrel of the fluid. A preferred non-ionic compound for the emulsification of oil is polyoxyethylene ether of nonyl phenol where $n$ is thirty $$C_9H_{19}—C_6H_4—O—(CH_2—CH_2—O)_{30}—H$$

The effect of the non-ionic compound on the rheological properties of a drilling fluid, we have discovered, is enhanced by the addition to the fluid of a water soluble inorganic salt. Thus, the yield point, plastic viscosity, and gel strength of the fluid is further reduced as the result of the presence of the inorganic salt. Ordinarily, the presence of a water soluble inorganic salt in a drilling fluid containing clay and water causes agglomeration of the clay. However, the degree of agglomeration of the clay in a drilling fluid containing the non-ionic compound which is due to the presence of a water soluble inorganic salt is greater than that obtained with the same amount of water soluble inorganic salt in the absence of the non-ionic compound. In accordance with a particular embodiment of the invention, the drilling fluid contained clay, water, and non-ionic compound also contains a water soluble inorganic salt.

Preferred inorganic salts are calcium sulfate, calcium chloride, sodium chloride, and potassium chloride. The amounts may be as desired. For example, the amounts may be between about two and twenty pounds per barrel. Satisfactory results may be obtained employing inorganic salt in the amount of about five pounds per barrel of drilling fluid. If desired, the inorganic salt may be supplied by employing sea water as all or part of the aqueous phase of the drilling fluid.

As an inorganic salt, it is particularly preferred to employ calcium sulfate. Calcium sulfate is sufficiently soluble to obtain a desired enhancement of the effect of the non-ionic compounds on the rheological properties of he drilling fluid. However, the solubility is sufficiently limited that the electrical resistivity of the drilling fluid is not decreased to the point that interference with satisfactory electrical logging results. Further the pH of the drilling fluid will be neutral. Additionally, as a result of the limited solubility, an excess of the salt can be maintained in the drilling fluid without affecting the electrical resistivity or the pH.

Upon addition of an inorganic salt to a drilling fluid containing clay and water, there is an initial increase in the rheological properties of the fluid. Depending upon the amount of clay and the amount of inorganic salt, the increase may be appreciable. Subsequently, however, the plastic viscosity of the fluid begins to decrease. Generally, the yield point and gel strengths remain high. Where the fluid contains the non-ionic compound, the yield point and gel strengths also decrease. The rate of decrease can be accelerated with agitation.

The addition of inorganic salt to the drilling fluid containing clay, water, and non-ionic compound is particularly advantageous where contamination of the fluid with salt or anhydrite may be encountered during drilling. Upon contamination of the fluid with salt or anhydrite, the rheological properties of the fluid will begin to increase. Depending upon the amount of clay and the amount of salt or anhydrite, the increase in the rheological properties of the drilling fluid may be sufficiently high to require an undesirably large increase in the pump pressure for maintenance of circulation of the fluid. Further, in the event circulation is stopped, inordinately high pump pressures may be required to restore circulation. However, where the drilling fluid containing clay, water, and non-ionic compound also contains inorganic salt, the effect of salt or anhydrite contaminating the drilling fluid will be minimized or may be completely absent.

The presence of the non-ionic compound in the aqueous phase of the drilling fluid tends to increase to a slight extent the water loss of the drilling fluid. Where an inorganic salt is present in the drilling fluid containing the non-ionic compound the tendency of the fluid to an increase in water loss becomes greater. It is preferred, therefore, particularly where the drilling fluid will contain inorganic salt, that the drillling fluid contain an agent to correct water loss. Any suitable type of water loss reducing agent may be employed. Alkali metal salt of carboxymethylcellulose, such as sodium carboxymethylcellulose, may be employed. Starch may also be employed. Satisfactory results may be obtained employing water loss reducing agents of the polyacrylate type such as polyacrylic acid or ammonium or alkali metal polyacrylates.

A particular advantage of the drilling fluid of the invention resides in the fact that it may be changed in composition or character to meet changes in drilling conditions without adverse effect on its rheological properties. For example, a drilling fluid of the invention having a liquid phase consisting of water may be converted to an emulsion drilling fluid during drilling by the addition of oil. Further, a drilling fluid of the invention containing clay in the sodium form, can be converted to a calcium type drilling fluid during drilling by the addition of a water soluble calcium compound. More significantly, however, a drilling fluid of the invention of the calcium type can be converted to a sodium type, i.e., where the clay is in the sodium form, by the addition of sodium chloride. The conversion to the sodium type may also be effected by adding sodium carbonate, sodium orthophosphate, or sodium citrate to the fluid. With sodium compounds such as the latter, precipitation of the calcium will be effected.

The following examples will be illustrative of the invention.

Example I

This example will illustrate the rheological properties of a drilling fluid of the invention. A drilling fluid was prepared by admixing sodium montmorillonite and calcium montmorillonite with water. The sodium montmorillonite was employed in the amount of 8 pounds per barrel of the water and the calcium montmorillonite was employed in the amount of 25 pounds per barrel of the water. Following preparation, the drilling fluid was aged for 16 hours at 170° F. To a sample of the aged drilling fluid were added polyoxyethylene ether of phenol,

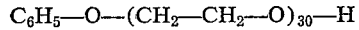

$$C_6H_5\text{—}O\text{—}(CH_2\text{—}CH_2\text{—}O)_{30}\text{—}H$$

in the amount of 6 pounds per barrel of the fluid and oxyethylene ether of nonyl phenyl,

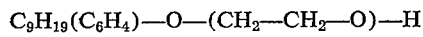

$$C_9H_{19}(C_6H_4)\text{—}O\text{—}(CH_2\text{—}CH_2\text{—}O)\text{—}H$$

in the amount of 0.8 pound per barrel of the fluid. This sample was then aged for 16 hours at 170° F. A control sample of the drilling fluid was also aged for this additional period of 16 hours at 170° F. Following the second aging, the yield point, the plastic viscosity, and the initial and 10-minute gel strengths of each of these samples were measured. The table gives the results obtained. In the table, Sample No. 1 is the control sample and Sample No. 2 is the sample containing the polyoxyethylene ether of phenol and the oxyethylene ether of nonyl phenol.

TABLE I

| Sample No.: | Yield Point | Plastic Viscosity | Gel Strength | |
|---|---|---|---|---|
| | | | Initial | 10 Min. |
| 1 | 19 | 15.3 | 10 | 20 |
| 2 | 2.0 | 11.0 | 1 | 4 |

It will be observed from the table that the drilling fluid containing the polyoxyethylene ether of phenol and the oxyethylene ether of nonyl phenol had a yield point approximately one-tenth of the yield point of the fluid without addition of these compounds.

Example II

This example will illustrate the effect of the order of addition of clay and non-ionic compound on the rheological properties of a drilling fluid.

Commercial bentonite was added to distilled water in the amount of 6.0 percent by weight of the water to form a first mixture. The mixture was then aged at 170° F. for 16 hours. The plastic viscosity, yield point, and gel strengths of the mixture were then measured.

A second mixture was prepared by adding commercial bentonite to distilled water in the amount of 6.0 percent by weight of the water and, after aging at 170° F. for 16 hours, adding polyoxyethylene ether of phenol,

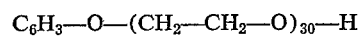

$$C_6H_3\text{—}O\text{—}(CH_2\text{—}CH_2\text{—}O)_{30}\text{—}H$$

to the mixture in the amount of 7.5 pounds per barrel of water and oxyethylene ether of nonyl phenol,

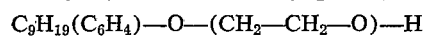

$$C_9H_{19}(C_6H_4)\text{—}O\text{—}(CH_2\text{—}CH_2\text{—}O)\text{—}H$$

in the amount of 0.5 pound per barrel of water. The mixture was aged at 170° F. for 16 hours. The plastic viscosity, yield point, and gel strengths were measured after the aging period.

A third mixture was prepared by adding polyoxyethylene ether of phenol, $C_6H_5$—O—$(CH_2$—$CH_2$—O$)_{30}$—H, and oxyethylene ether of nonyl phenol, $$C_9H_{19}(C_6H_4)\text{---O---}(CH_2\text{---}CH_2\text{---}O)\text{---H}$$

to water in the amounts of 7.5 and 0.5 pounds per barrel of the water, respectively. This mixture was then aged at 170° F. for 16 hours. Thereafter, commercial bentonite was added to the mixture in the amount of 6.0 weight percent of the water. The mixture was aged at 170° F. for 16 hours, after which the plastic viscosity, yield point, and gel strengths of the mixture were measured.

The following table indicates the rheological properties of the mixtures.

TABLE II

| Mixture: | Plastic Viscosity | Yield Point | Initial Gel Strength | 10 Minute Gel Strength |
|---|---|---|---|---|
| 1 | 41 | 30 | 12 | 43 |
| 2 | 33.3 | 12.5 | 1 | 23 |
| 3 | 17 | 3.5 | 1 | 11 |

It will be noted from the table that the mixture of bentonite and water containing the non-ionic compound and the predominantly hydrophobic compound had a plastic viscosity, yield point, and gel strengths lower than those of the mixture of water and bentonite. It will also be observed from the table that, where the non-ionic compound and the predominantly hydrophobic compound had been added to the water prior to the bentonite, the plastic viscosity, yield point, and gel strengths were lower than the mixture obtained by adding the non-ionic compound and the predominantly hydrophobic compound to the mixture of bentonite and water.

Example III

This example will be illustrative of the rheological properties of a drilling fluid containing clay, water, defoamant, and non-ionic compound and of a similar drilling fluid containing water soluble inorganic salt.

A drilling fluid was prepared by adding commercial bentonite to water in the amount of 6 percent by weight of the water. The mixture was then aged to 170° F. for 16 hours. The plastic viscosity, yield point, and gel strengths and filter loss of a first sample of this mixture were then measured. To a second sample of this mixture were added polyoxyethylene ether of phenol, $$C_6H_5\text{---O---}(CH_2\text{---}CH_2\text{---}O)_{30}\text{---H}$$

and oxyethylene ether of nonyl phenol, $$C_9H_{19}\text{---}C_6H_4\text{---O---}(CH_2\text{---}CH_2\text{---}O)\text{---H}$$

in the amounts of 7.5 and 0.5 pounds per barrel of the water present in the mixture, respectively. To a third sample of the mixture was added sodium chloride in the amount of 10 percent by weight. To a fourth sample was added sodium chloride in the amount of 10 percent by weight and polyoxyethylene ether of phenol and oxyethylene ether of nonyl phenol in the amounts of 7.5 and 0.5 pounds per barrel of the water present in the mixture, respectively. To a fifth sample was added anhydrite in the amount of 1 percent by weight of the mixture. To a sixth sample were added anhydrite in the amount of 1 percent by weight and polyoxyethylene ether of phenol and oxyethylene ether of nonyl phenol in the amounts of 7.5 and 0.5 pounds per barrel of the water present in the mixture, respectively. Each of these latter five samples was aged at 170° F. for 16 hours. At the end of the aging period, the plastic viscosity, yield point, and gel strengths of the samples were measured. The results of the measurements of the six samples are given in the table.

TABLE III

| Sample No.: | Plastic Viscosity | Yield Point | Gel Strength Initial | Gel Strength 10 Min |
|---|---|---|---|---|
| 1 | 41 | 30 | 12 | 43 |
| 2 | 33 | 12 | 1 | 23 |
| 3 | 12 | 73 | 43 | 47 |
| 4 | 3 | 1 | 1 | 1 |
| 5 | 12 | 14 | 9 | 27 |
| 6 | 11 | 8 | 2 | 5 |

It will be seen from the above table that the drilling fluid containing polyoxyethylene ether of phenol and oxyethylene ether of nonyl phenol had reduced plastic viscosity, yield point, and gel strengths. It will be noted also from the table that the drilling fluid containing the sodium chloride had a lower plastic viscosity than the drilling fluid containing the polyoxyethylene ether of phenol and oxyethylene ether of nonyl phenol. However, it will also be noted that the drilling fluid containing the salt had inordinately high values of yield point, initial and 10-minute gel strengths. On the other hand, the plastic viscosity, yield point, and gel strengths of the mixture containing the sodium chloride, polyoxyethylene ether of phenol and oxyethylene ether of nonyl phenol were at extremely low values.

The effect of the anhydrite was similar to the effect of the salt in that it decreased the plastic viscosity, yield point, and gel strengths of the drilling fluid. Further, the reduction in plastic viscosity, as a result of the anhydrite being present, was greater than in the case of the drilling fluid containing the polyoxyethylene ether of phenol and the oxyethylene ether of nonyl phenol, although the yield point, gel strengths, and filter losses were greater. Where the anhydrite, polyoxyethylene ether of phenol, and oxyethylene ether of nonyl phenol compound were employed, a greater reduction in plastic viscosity, yield point, and 10-minute gel strength was obtained than was obtained by the use of the anhydrite or the use of the polyoxyethylene ether of phenol and the oxyethylene ether of nonyl phenol.

Example IV

In this example, to a sample of aged drilling fluid prepared as described in connection with Example I were added polyoxyethylene ether of phenol, $$C_6H_5\text{---O---}(CH_2\text{---}CH_2\text{---}O)_{30}\text{---H}$$

in the amount of 6 pounds per barrel of the fluid and trioxyethylene ether of octyl phenol, $$C_8H_{17}(C_6H_4)\text{---O---}(CH_2\text{---}CH_2\text{---}O)_3\text{---H}$$

in the amount of 0.2 pound per barrel of the fluid. The yield point, plastic viscosity, and initial and 10-minute gel strengths of the fluid were measured after aging for 16 hours at 170° F. The table gives the results obtained. The table also gives the results obtained with a control sample subjected to the same aging procedure. In the table the control sample is identified as Sample No. 1 and the sample containing the polyoxyethylene ether of phenol and the trioxyethylene ether of octyl phenol is identified as Sample No. 2.

TABLE IV

| Sample No.: | Yield Point | Plastic Viscosity | Gel Strength Initial | Gel Strength 10 Min. |
|---|---|---|---|---|
| 1 | 19.0 | 15.3 | 10 | 20 |
| 2 | 2.0 | 11.8 | 1 | 4 |

It will be observed from the table that the drilling fluid containing the polyoxyethylene ether of phenol and the trioxyethylene ether of octyl phenol had a considerably reduced yield point.

Example V

In this example, a drilling fluid was prepared by admixing sodium montmorillonite with water in the amount of 22 pounds of sodium montmorillonite to one barrel of water. The resulting fluid was aged for 16 hours at 170° F. To a sample of the aged fluid were added polyoxyethylene ether of phenol, $$C_6H_5-O-(CH_2-CH_2-O)_{30}-H$$

in the amount of 5.6 pounds per barrel of fluid and oxyethylene ether of nonyl phenol, $$C_9H_{19}(C_6H_4)-O-(CH_2-CH_2-O)-H$$

in the amount of 0.4 pound per barrel. This sample, as well as a control sample of the drilling fluid, was aged for an additional period of 16 hours at 170° F. Following aging, the yield point, plastic viscosity, and initial and 10-minute gel strengths of the two samples were measured. The table gives the results obtained, Sample No. 1 in the table being the control sample and Sample No. 2 in the table being the sample containing the polyoxyethylene ether of phenol and the oxyethylene ether of nonyl phenol.

TABLE V

| Sample No.: | Yield Point | Plastic Viscosity | Gel Strength Initial | Gel Strength 10 Min. |
|---|---|---|---|---|
| 1 | 13.8 | 20.4 | 4 | 16 |
| 2 | 5.8 | 19.6 | 1 | 8 |

It will be observed from the above table that the drilling fluid containing the polyoxyethylene ether of phenol and the oxyethylene ether of nonyl phenol had a considerably reduced yield point.

Example VI

This example will illustrate the effect of the number of carbon atoms in the hydrophobic group, R, of the non-ionic compound on the properties of drilling fluid.

Five drilling fluids were prepared having the following composition:

| | Pounds per barrel |
|---|---|
| Sodium montmorillonite clay | 6 |
| Calcium montmorillonite clay | 90 |
| Calcium sulfate | 10 |
| Sodium carboxymethylcellulose | 1.5 |
| Non-ionic compound | 14.5 |
| Water, to make one barrel. | |

Each drilling fluid was aged for a period of 16 hours at 170° F. Following aging, the plastic viscosity, yield point, gel strengths, and foam heights of each were measured. Foam height is a measure of the foaming tendency of the fluid and is measured by bubbling air saturated with water through a column of the fluid until the height of foam above the fluid reaches equilibrium. The foam is expressed as the height in centimeters of the column of drilling fluid and foam at equilibrium less the original height of the column of drilling fluid. The table gives the results obtained, the first column identifying the non-ionic compound and the second column indicating the number of carbon atoms in the hydrophobic portion, R, of the compound. Each non-ionic compound had 30 mols of ethylene oxide in the ethylene oxide chain.

Example VII

In this example, samples of a native drilling fluid were taken from the mud pit at a well site. The drilling fluid had a density of 9.6 pounds per gallon and consisted of water and clay solids picked up during circulation of the fluid in the well bore during the drilling operations. To a sample of this fluid were added polyoxyethylene ether of phenol, $C_6H_5-O-(CH_2-CH_2-O)_{30}-H$, in the amount of 5.6 pounds per barrel of the fluid and oxyethylene ether of nonyl phenol, $$C_9H_{19}(C_6H_4)-O-(CH_2-CH_2-O)-H$$

in the amount of 0.4 pound per barrel. This sample and a control sample of the drilling fluid were then aged for a period of 16 hours at 170° F. Following aging, the yield point, plastic viscosity, and initial and 10-minute gel strengths of each of these samples were determined. The results are given in the table. In the table, Sample No. 1 is the control sample and Sample No. 2 is the sample containing the polyoxyethylene ether of phenol and the oxyethylene ether of nonyl phenol.

TABLE VII

| Sample No.: | Yield Point | Plastic Viscosity | Gel Strength Initial | Gel Strength 10 Min. |
|---|---|---|---|---|
| 1 | 11 | 14.8 | 5 | 35 |
| 2 | 4.5 | 14.8 | 1 | 21 |

It will be observed from the table that the yield point of the treated fluid was considerably lower than the yield point of the control sample.

Example VIII

This example will be illustrative of the treatment of a drilling fluid during drilling operations.

In an oil well being drilled in Louisiana, drilling was effected to 4700 feet employing a native drilling fluid having properties, on the average, as follows:

| | |
|---|---|
| Yield point | lb./100 ft.² 4.5 |
| Plastic viscosity | centipoises 9.5 |
| Initial gel strength | lb./100 ft.² 1 |
| 10-Minute gel strength | lb./100 ft.² 40 |

At 4700 feet, upon encountering shale stringers, the drilling fluid was converted to a calcium treated drilling fluid by admixing therewith 10 pounds per barrel of calcium sulfate. Sodium carboxymethylcellulose was added in the amount of 1.75 pounds per barrel. There were also added to the fluid polyoxyethylene ether of phenol, $$C_6H_5-O-(CH_2-CH_2-O)_{30}-H$$

in the amount of 3.75 pounds per barrel and oxyethylene ether of nonyl phenol, $$C_9H_{19}(C_6H_4)-O-(CH_2-CH_2-O)-H$$

in the amount of 0.25 pound per barrel. The properties of the drilling fluid after the addition of these compounds were as follows:

| | |
|---|---|
| Yield point | lb./100 ft.² 1.8 |
| Plastic viscosity | centipoises 10.3 |
| Initial gel strength | lb./100 ft.² 0 |
| 10-Minute gel strength | lb./100 ft.² 0 |

Drilling was then continued employing this fluid until the hole was successfully completed at a depth of 9700 feet.

TABLE VI

| Non-ionic Compound | No. of Carbon Atoms | Plastic Viscosity | Yield Point | Gel Strength Initial | Gel Strength 10 Min. | Foam Height |
|---|---|---|---|---|---|---|
| Polyoxyethylene ether of butyl alcohol | 4 | 62 | 10 | 8 | 70 | 20 |
| Polyoxyethylene ether of phenol | 6 | 53 | 5 | 3 | 24 | 19 |
| Polyoxyethylene ether of hexyl alcohol | 6 | 51 | 5 | 3 | 27 | 24 |
| Polyoxyethylene ether of decyl alcohol | 10 | 45 | 6 | 3 | 18 | 35 |
| Polyoxyethylene ether of lauryl alcohol | 12 | 51 | 11 | 10 | 18 | 70 |

Four other wells had been previously drilled in the vicinity of the above-mentioned well. In each of these wells, the same type of drilling fluid was employed initially as was employed in the above-mentioned well. At about the same depth as in the above-mentioned well, each of the drilling fluids employed in the drilling of these four previous wells was converted to a conventional calcium treated drilling fluid by addition of calcium hydroxide. Sodium hydroxide and sodium carboxymethylcellulose were also added. However, the non-ionic compound and the predominantly hydrophobic compound were not added to these drilling fluids. Drilling was continued in these four wells to substantially the same depth as the original well. In the drilling of the latter well, compared with the drilling of the previous four wells, drilling time was reduced 15 to 50 percent, the number of drill bits employed was reduced by 12 to 40 percent, pump maintenance was reduced by 75 percent, no wash-outs were encountered, and a thin mud cake with a minimum of filtrate invasion was formed on the walls of the well bore hole.

Example IX

This example will illustrate the effect of increasing quantities of solids upon the rheological properties of the drilling fluid of the invention.

A drilling fluid was prepared by adding 5 percent by weight of attapulgite to aqueous solution containing 3.5 percent by weight of sodium chloride. To samples of this mixture were added sodium carboxymethylcellulose in the amount of 2.4 pounds per barrel, polyoxyethylene ether of phenol ($n=30$) in the amount of 11 pounds per barrel, oxyethylene ether of nonyl phenol in the amount of .8 pound per barrel, and varying amounts of high grade bentonite. After aging for 16 hours at 170° F., the plastic viscosity, yield point, and gel strengths of each of the samples were measured. The table gives the results obtained. In the table, the amount of bentonite is given in pounds per barrel.

TABLE VIII

| Amount of Bentonite | Plastic Viscosity | Yield Point | Gel Strength | |
|---|---|---|---|---|
| | | | Initial | 10 Min. |
| 0 | 4.3 | 1.1 | 0 | 2 |
| 30 | 7.0 | 7.0 | 2 | 17 |
| 50 | 8.5 | 11.0 | 4 | 30 |
| 60 | 10.5 | 11.5 | 5 | 35 |
| 70 | 12.0 | 14.0 | 6 | 44 |
| 80 | 14.0 | 12.0 | 7 | 67 |
| 85 | 13.0 | 16.0 | 10 | 10.2 |

In the examples above, and elsewhere, the recitation of specific amounts of non-ionic compound and predominantly hydrophobic compound, and other compounds and materials, is intended to have reference to the compounds or materials in a state unmixed with inert materials. Commercially, the compounds may be available in admixture with solvents, diluents, or other inert materials for ease in handling or otherwise. For example, the non-ionic compounds and the predominantly hydrophobic compounds, or other defoamants may be commercially available in the forms of solutions, or suspensions, in water. Accordingly, where the compounds or materials are in admixture with inert materials, the amounts employed should be selected taking into consideration the proportions of the compounds or materials to the inert materials in the mixtures.

In the tables hereinabove, yield point is given in pounds per 100 square feet, plastic viscosity in centipoises, and gel strengths in pounds per 100 square feet.

Having thus described our invention, it will be understood that such description has been given by way of illustration and not by way of limitation, reference for the latter purpose being had to the appended claims.

We claim:

1. A drilling fluid having a solid phase and a liquid phase, said solid phase comprising a clay capable of being hydrated and dispersed by water with consequent increase in the yield point of said drilling fluid and said liquid phase having a continuous water phase capable of hydrating and dispersing said clay with consequent increase in the yield point of said drilling fluid, and containing a first water soluble, non-ionic compound having surface active properties and characterized by the formula

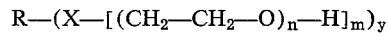

wherein R is a hydrophobic group containing at least four but less than twelve carbon atoms, X is a structural element selected from the group consisting of —O—, —S—,

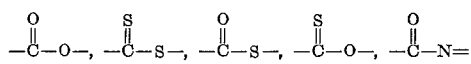

and

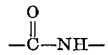

($CH_2$—$CH_2$—O) is ethylene oxide, $n$ is a whole number, H is hydrogen, $m$ is a whole number one less than the valence of the structural element X, $y$ is a whole number, and the product of $n$, $m$ and $y$ is at least as great as ten, said first water soluble, non-ionic compound being in an amount sufficient to decrease the yield point of said drilling fluid, a predominantly hydrophobic, non-ionic defoamant compound having surface-active properties and characterized by the formula

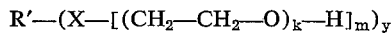

wherein R′ is a hydrophobic group containing at least twelve carbon atoms, X is a structural element selected from the group consisting of —O—, —S—,

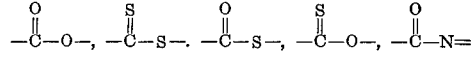

and

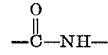

($CH_2$—$CH_2$—O) is ethylene oxide, $n$ is a whole number, H is hydrogen, $m$ is a whole number one less than the valence of the structural element X, $y$ is a whole number, and the product of $k$, $m$ and $y$ is not greater than three, said hydrophobic, non-ionic defoamant compound being in an amount of about one-thirtieth to one-fifth by weight of said first water soluble, non-ionic compound having surface active properties, a defoamant comprising an oil in an amount of about 1 to 15 percent by volume of said drilling fluid, and a second water soluble, non-ionic compound having surface-active properties characterized by the formula R—(X—[($CH_2$—$CH_2$—O)$_n$—H]$_m$)$_y$, wherein R is hydrophobic group containing at least twelve carbon atoms, X is a structural element selected from the group consisting of —O—, —S—,

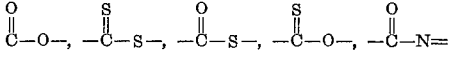

and

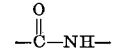

($CH_2$—$CH_2$—O) is ethylene oxide, $n$ is a whole number, H is hydrogen, $m$ is a whole number one less than the valence of the structural element X, $y$ is a whole number, and the product of $n$, $m$, and $y$ is at least as great as ten, said second water soluble, non-ionic compound being in an amount sufficient to effect emulsification of said oil.

2. The drilling fluid as defined in claim 1 wherein said first water soluble, non-ionic compound is polyoxyethylene ether of phenol having the formula

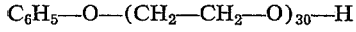

said predominantly hydrophobic, non-ionic defoamant compound is oxyethylene ether of nonyl phenol having the formula $C_9H_{19}$—$C_6H_4$—($CH_2$—$CH_2$—O)—H, and said second water soluble, non-ionic compound is polyoxyethylene ether of nonyl phenol having the formula
$C_9H_{19}—C_6H_4—(CH_2—CH_2—O)_{30}—H$.

References Cited
UNITED STATES PATENTS

| | | | |
|---|---|---|---|
| 2,209,591 | 7/1940 | Barnes et al. | 252—8.5 |
| 2,453,352 | 11/1948 | Tremain et al. | 252—321 |
| 2,589,949 | 3/1952 | Meadors | 252—8.5 |
| 3,062,740 | 11/1962 | Reddie et al. | 252—8.5 |
| 3,236,769 | 2/1966 | Burdyn et al. | 252—8.5 |

LEON D. ROSDOL, *Primary Examiner.*

H. B. GUYNN, *Assistant Examiner.*